ns Patent [19]

Ekstrom, Jr.

[11] 4,221,134
[45] Sep. 9, 1980

[54] DIFFERENTIAL PRESSURE TRANSDUCER WITH STRAIN GAUGE

[76] Inventor: Regner A. Ekstrom, Jr., P.O. Box 232, Markham, Ill. 60429

[21] Appl. No.: 67,435

[22] Filed: Aug. 20, 1979

Related U.S. Application Data

[63] Continuation-in-part of Ser. No. 968,511, Dec. 11, 1978, abandoned.

[51] Int. Cl.³ ............................ G01L 9/06; G01F 1/38
[52] U.S. Cl. ............................................. 73/721; 338/4; 73/861.47
[58] Field of Search ....................... 73/720, 721, 205 R, 73/228, 182, 777, 726, 727; 338/4, 42

[56] References Cited

U.S. PATENT DOCUMENTS

| | | | |
|---|---|---|---|
| 2,816,441 | 12/1957 | Ezekiel | 73/182 |
| 3,343,420 | 9/1967 | Kondo et al. | 73/720 |
| 4,161,887 | 7/1979 | Stone et al. | 73/720 |
| 4,172,388 | 10/1979 | Gabrielson | 73/721 |

Primary Examiner—Donald O. Woodiel
Attorney, Agent, or Firm—Darbo & Vandenburgh

[57] ABSTRACT

To provide a low cost electrical readout for differential fluid pressure, a strain gauge, preferably a piezo-resistive semiconductor, is bonded to a flexible strip of metal sandwiched diametrically between a matched pair of diaphragms circumferentially sealed in a fluid-tight cavity, preferably formed by a pair of modified orifice plates. Opposite sides of the diaphragm assembly are in fluid communication via suitable tubing with a fluid restrictive device, formed in one embodiment by a vane-type flowmeter. An inlet and outlet formed in each orifice plate allows shunted fluid to flow across opposite faces of the diaphragm assembly so that the semiconductor strain gauge can be used to sense the temperature of the fluid in the conduit. Replaceable inserts in the face of each orifice plate permit simple alteration of the device to meet desired operational parameters.

23 Claims, 15 Drawing Figures

U.S. Patent   Sep. 9, 1980   Sheet 1 of 4   4,221,134
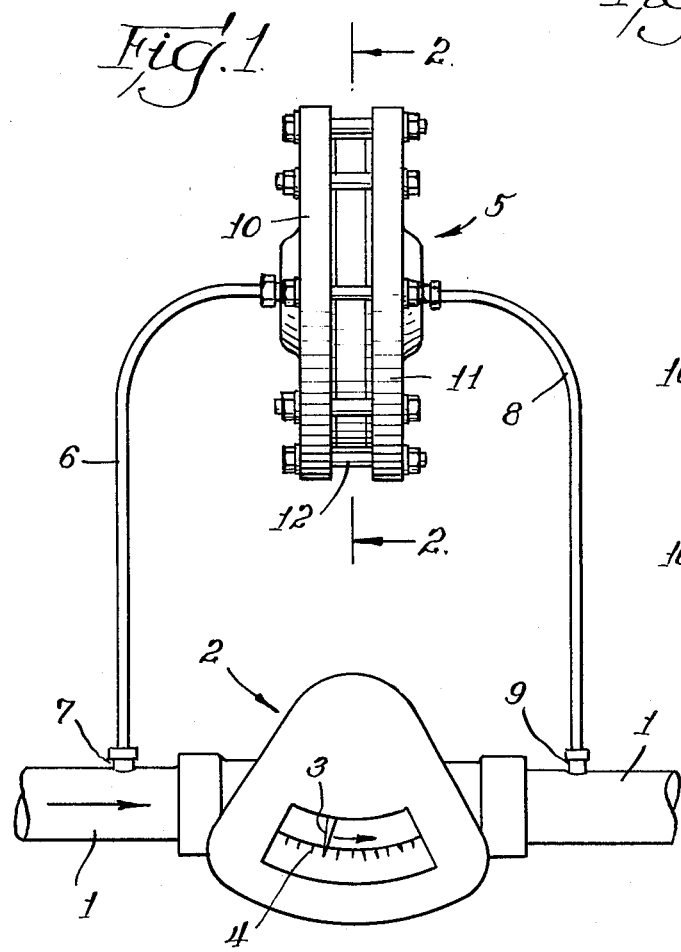
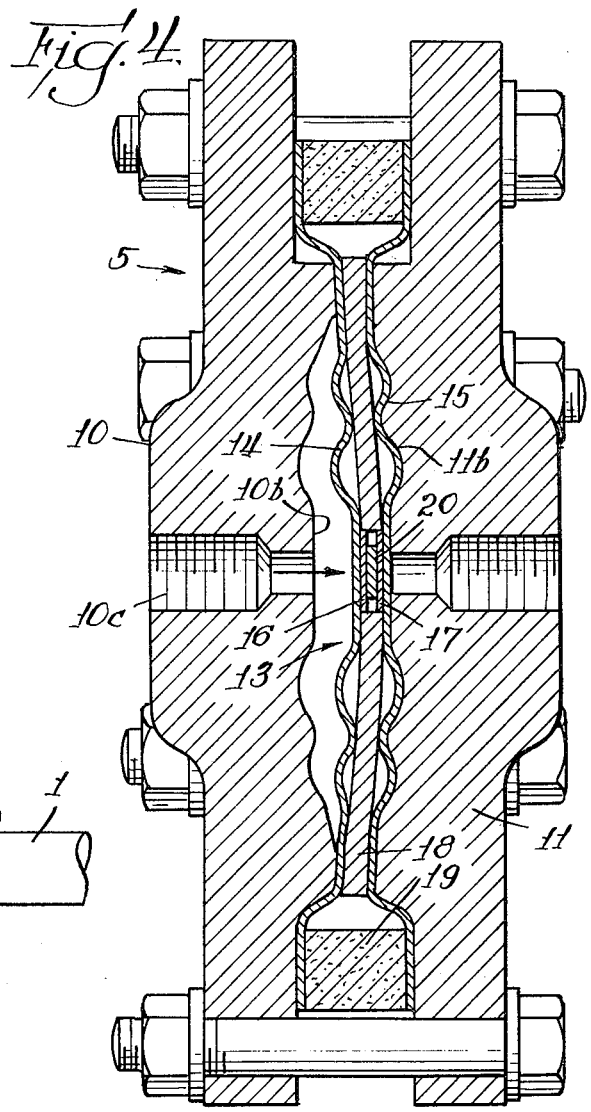
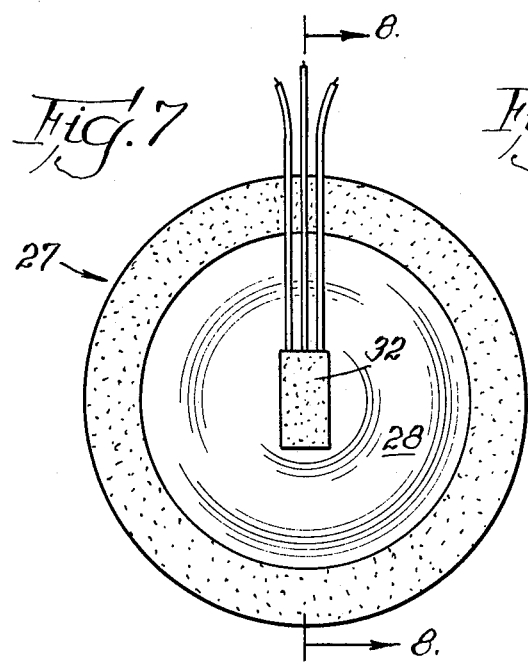
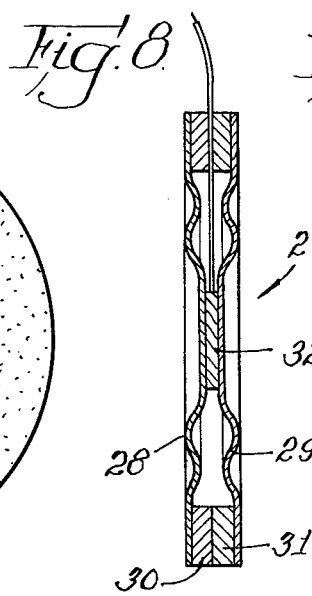
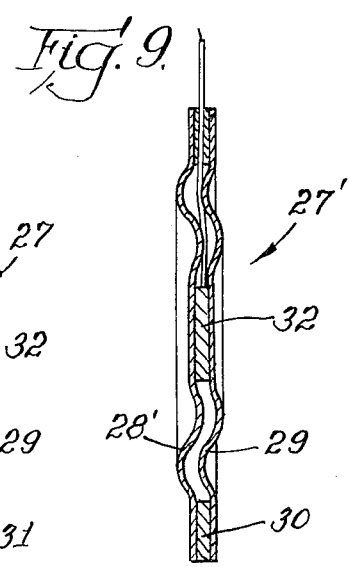

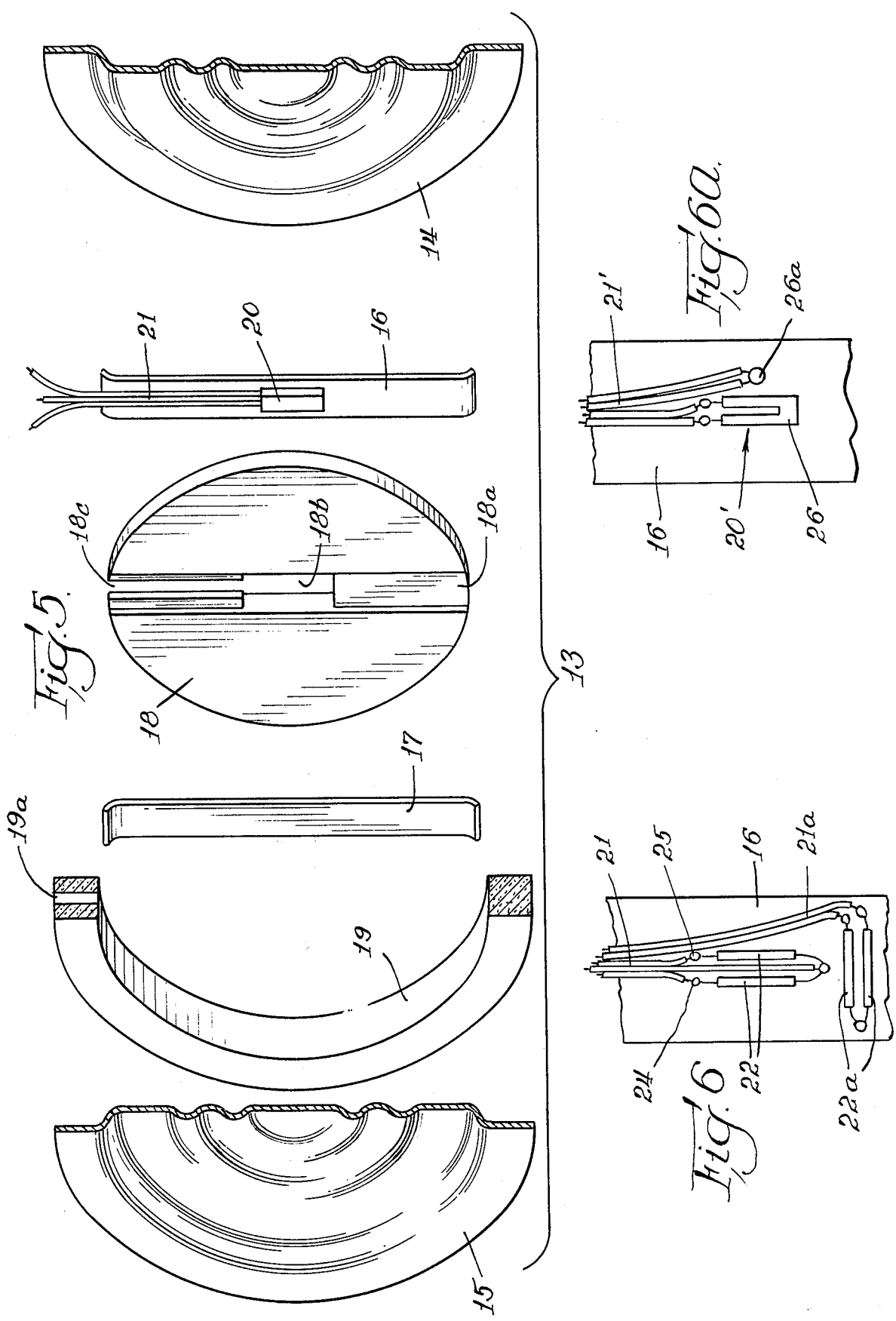

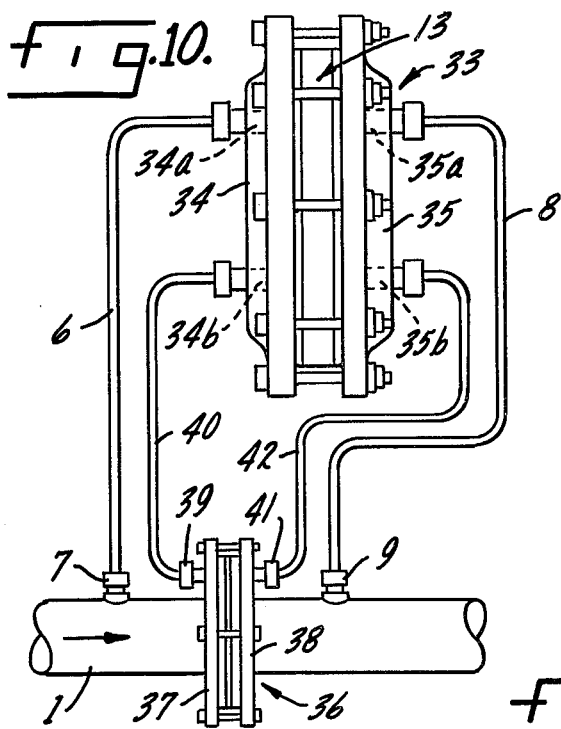

DIFFERENTIAL PRESSURE TRANSDUCER WITH STRAIN GAUGE

This application is a continuation-in-part of application Ser. No. 968,511, filed Dec. 11, 1978, now abandoned.

BACKGROUND OF THE INVENTION

The invention relates generally to the field of differential fluid pressure measuring apparatus and flowmeters. Monitoring the rate at which fluid is flowing in a line is frequently necessary, particularly where the rate of flow has to be controlled within certain limits in process applications requiring a supply of one fluid component at a nominal rate, or where the rate of flow is indicative of a system input requiring adjustment of system variables, such as in chemical refineries. An instrument which has proved effective and versatile for measuring flow rate is the direct reading vane-type flowmeter shown for example in U.S. Pat. Nos. 2,873,606, 2,892,348 and 3,090,231 to Regner A. Ekstrom, Jr.

With advances in process control technology and the growth of more sophisticated and demanding applications over the years, it has become desirable in many situations to have a remote electrical readout indicative of flow rate in a particular fluid line, for example, in a Petroleum plant. The science of transduction has in the meantime developed several ways to convert flow rate to an electrical signal, for example, turbines with rotating magnets and acoustical Doppler effect devices. These systems, while producing electrical outputs, require relatively complicated circuitry and either suffer poor reliability in demanding applications or are extremely expensive. Another type of flowmeter with an electrical output employs a strain gauge mounted on an arm projecting into the line, which is deflected by the force of the impinging stream.

While these systems have their place, there remains an unfilled need for a low-cost, rugged, versatile instrument for monitoring flow rate particularly in the types of environments and applications served by vane-type and other differential pressure type flowmeters in the past.

SUMMARY OF THE INVENTION

The general objective of the invention is to provide an electrical signal (i.e., a change in an electrical parameter such as resistance) which is a function of the fluid flow rate as reflected by the pressure drop across a flow restrictive device in a fluid line. A pair of expansible fluid-tight chambers formed by diaphragms, bellows or the like are connected in fluid communication with respective points upstream and downstream of a flow restrictive device in a main fluid line. A flexible metal strip or flat beam carrying a strain gauge, preferably a piezo-resistive semiconductor, is connected to the expansible chambers and mounted for curvilinear deflection in accordance with the relative expansion of the chambers. In one embodiment, the strain gauge is bonded to a flexible strip of metal sandwiched diametrically between a pair of disc-shaped diaphragms circumferentially sealed in a fluid-tight cavity preferably formed by a pair of modified orifice plates. The diaphragms divide the cavity into two chambers. This assembly representing the differential pressure sensor is separate from the fluid line. Opposite sides of the diaphragm assembly are in communication via suitable tubing with the fluid line at two respective points therein separated by a flow restrictive device. The restriction can be provided by a line-mounted, vane-type flowmeter itself. An inlet and outlet formed in each orifice plate of the differential pressure sensor unit allows shunted fluid to flow across opposite faces of the diaphragm assembly so that a semi-conductor strain gauge can be used to sense the temperature of the fluid as well as deflection of the diaphragm assembly. In one form, replaceable inserts from the walls of the cavity opposite the faces of the diaphragm. The inserts are preferably contoured and spaced so that the diaphragm can "nest" harmlessly against the cavity wall at maximum deflection for over-pressure protection. In another form, integral wall surfaces are so contoured. A spring biasing system for the diaphragm assembly is also disclosed. While the invention disclosed herein is directed to the need for a low-cost, reliable electrical readout for flow rate, the apparatus will also serve to measure difference in static fluid pressures or pressures in different fluid lines.

DESCRIPTION OF THE DRAWINGS

FIG. 1 is a side view showing a differential pressure sensor mounted in parallel with a flowmeter according to the invention.

FIG. 4 is a cross-sectional view of the differential pressure sensing unit taken at lines 4—4 of FIG. 2, illustrating the over-pressure condition.

FIG. 5 is an axially exploded detail perspective view of the diaphragm assembly for the differential pressure sensing unit of FIGS. 2-4.

FIG. 6 and 6a are fragmentary face views of the area of the strip gauge to which the strain gauge assembly is attached, illustrating two alternate configurations.

FIG. 7 is a detail face view of the diaphragm with a strain gauge in an alternate embodiment for the differential pressure sensing unit.

FIG. 8 is a cross-sectional view of the diaphragm assembly for the differential pressure sensing unit taken at line 8—8 of FIG. 7.

FIG. 9 is a cross-sectional view similar to that of FIG. 8 illustrating another alternate embodiment of the diaphragm assembly of the differential pressure sensing unit.

FIG. 10 is a side view of a differential pressure sensing unit connected in parallel with a line mounted orifice plate.

FIG. 11 is a detail schematic view of one half of the differential pressure sensing unit showing an alternate embodiment having a bias adjustment mechanism.

FIG. 12 is a front view of an alternate embodiment in which a beam with a pair of strain gauges is deflected by a pair of opposed bellows.

FIG. 13 is an end view of the beam deflection apparatus of FIG. 12.

FIG. 14 is a cross-sectional view of an alternative embodiment of the differential pressure sensing unit as illustrated in FIG. 3.

DETAILED DESCRIPTION

Figure 2:
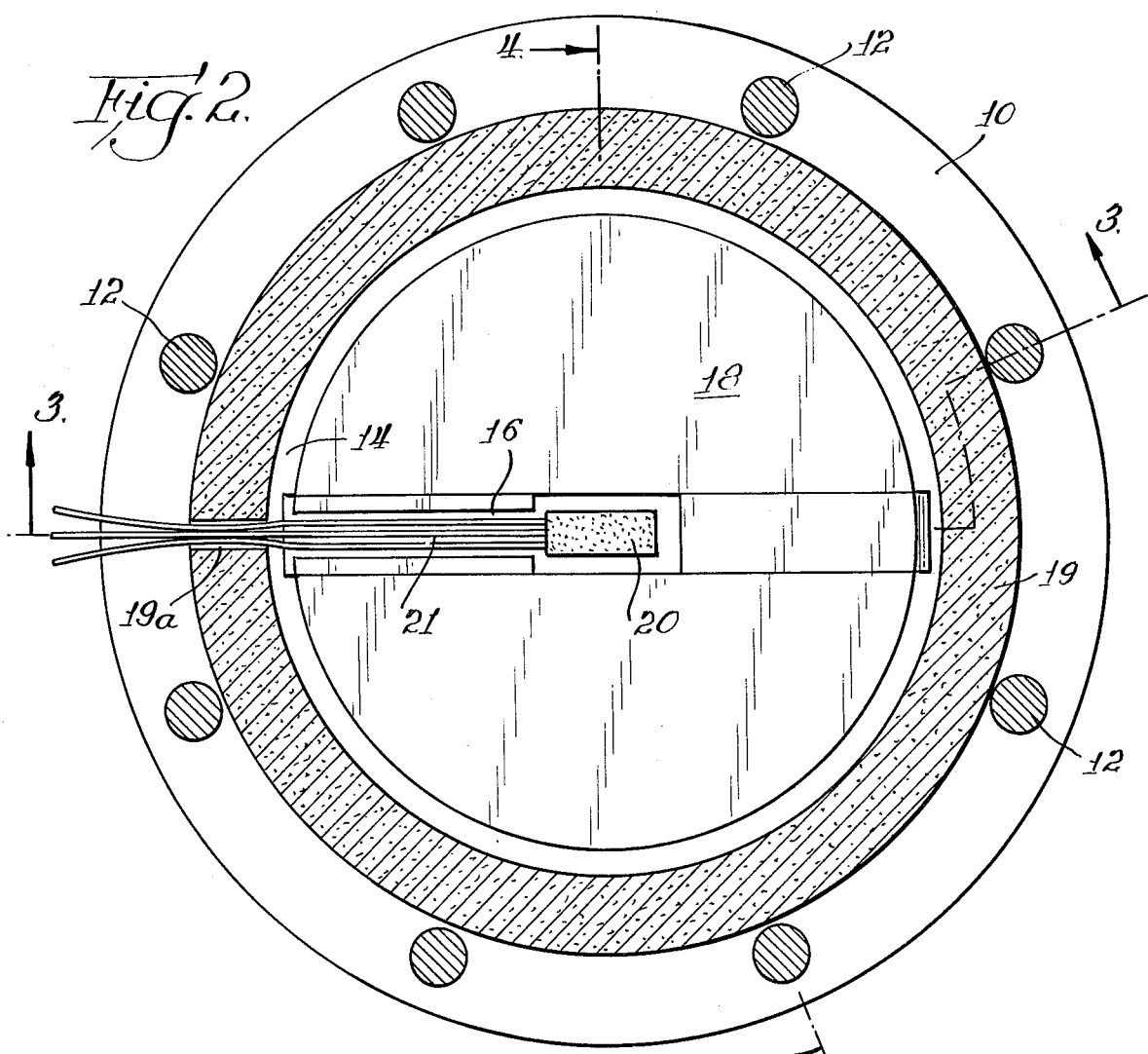
FIG. 2 is a cross-sectional view of the interior of the differential pressure sensing unit taken at lines 2—2 of FIG. 1.

FIG. 1 shows a fluid line 1 carrying a liquid or gas flowing in the direction of the arrow. Mounted in the line 1 is a direct reading mechanical flowmeter 2 of the type marketed by Erdco Engineering Corporation of Addison, Illinois with the trademark "VISUAL-FLO" as described in U.S. Pat. No. 2,892,348 (FIGS. 10–13). The flowmeter 2 has a single moving element, the vane 3, which swings in the direction of the accompanying arrow to create a larger opening through which the fluid can pass in response to increased rate of flow. For a constant flow rate, the vane 3 assumes a stationary equilibrium position. The edge of the vane 3 forms a pointer which, when observed through a transparent window, indicates the rate of flow with reference to the calibrated scale 4. Alternatively, the vane 3 is magnetically coupled to a separate pointer.

A differential pressure sensing unit 5 is mounted in parallel with the flowmeter 2 in order to sense the pressure drop in the fluid across the flowmeter 2. Tube 6 connects one side of the differential pressure sensing unit 5 to a tap 7 in the line 1 upstream of the flowmeter 2. Tube 8 connects the other side of the differential pressure sensing unit 5 to another tap 9 downstream of the flowmeter 2.

The flowmeter 2 itself creates a flow restriction or obstruction in the fluid line which produces a higher pressure level immediately upstream of the flowmeter 2. In place of the flowmeter 2 other restrictive devices may be used such as Venturis, pipe or tubing elbows, conduit skin friction devices and orifice plates, all of which present a fixed restriction. Since the flowmeter 2 is a variable orifice in effect, the variation in the orifice opening will also have an effect on the differential pressure between taps 7 and 9. Nevertheless, the differential pressure between these two points will still be corelated with the flow rate and thus the electrical output of the differential pressure sensing unit 5 will vary with the rate of flow in the fluid line 1.

Figure 3:
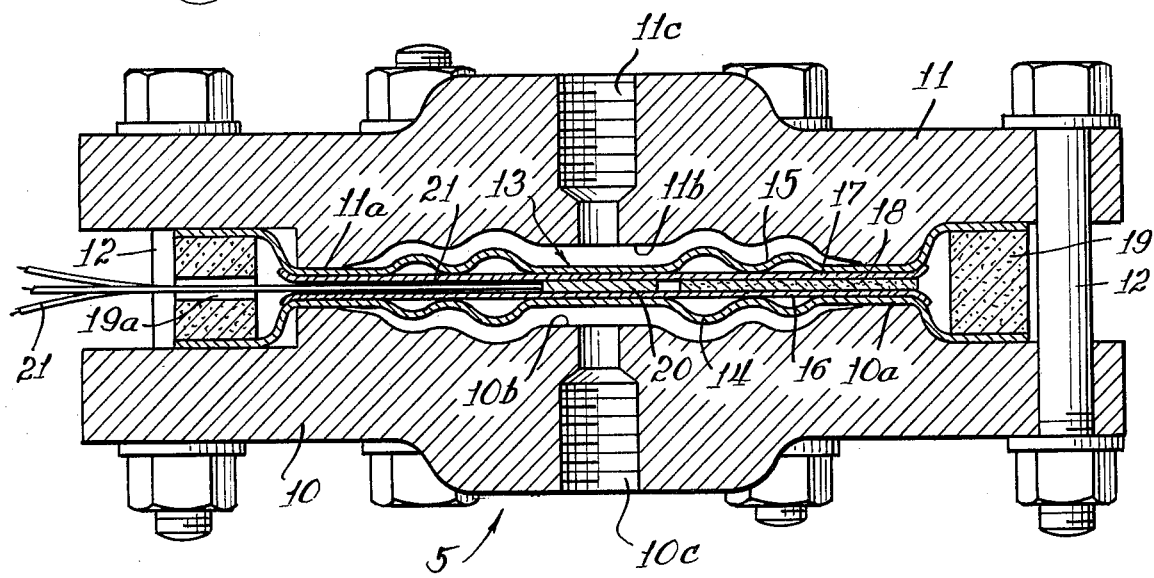
FIG. 3 is a cross-sectional view of the differential pressure sensing unit taken at lines 3—3 of FIG. 2.

The differential pressure sensing unit 5 shown in more detail in FIGS. 2 and 3 includes a matching pair of circular orifice plates 10 and 11 which are clamped together in opposition by a plurality of circumferentially distributed bolts 12 extending through the outer circumferential flanges of the orifice plates. The inner face of each orifice plate has a projecting circular rim 10a, 11a surrounding a circular recessed crater-like area 10b, 11b. Threaded central coaxial bores 10c and 11c through each of the orifice plates receive the fittings on the ends of the tubes 6 and 8 respectively as shown in FIG. 1.

A circular diaphragm assembly 13 is sandwiched between the orifice plates 10 and 11 respectively as shown in FIG. 3. The diaphragm assembly 13 includes a pair of matching opposed circular metal diaphragms 14 and 15 with a matching pair of flexible metal strips 16 and 17 arranged parallel and opposite each other along a diameter across the opposing faces of the diaphragms 14 and 15 separated by the disc-shaped, cut, incompressible gasket 18 (preferably of Kaopack or another compression gasket material) as shown in FIG. 5. The circumferential flanges of the opposed diaphragms 14 and 15 are flared to conform to the outer flanges of the orifice plates 10 and 11 and are separated by an outer sealing ring 19.

As shown schematically in FIGS. 2 and 5 a strain gauge assembly 20 is bonded to the surface of the metal strip 16. In FIG. 5 the gasket 18 has parallel diametrical grooves 18a or cut-outs formed on either side to receive the metal strips 16 and 17. A central window 18b is formed in the gasket to receive the strain gauge assembly 20. The electrical wires 21 leading from the strain gauge assembly 20 extend through a radial hole 19a in the sealing ring 19.

The strain gauge is cemented to only one of the metal strips, not both, and the wall of the gasket between the metal strips 16 and 17 (FIG. 5) should be of sufficient thickness that the exposed top of the strain gauge is not contacted by the face of the other strip 17. That is, there should be an air gap between the strain gauge and the other strip.

The strain gauge assembly 20 as shown in FIG. 6, preferably includes a pair of semiconductor strain gauges 22, for example model JP-025-120 manufactured by J.P Semiconductors, Inc., oriented parallel to the length of the strip 16. The semiconductor strain gauge exhibits a piezo-resistive effect which produces ohmic reponse to strain, i.e., curvilinear bending of its axis.

The leads from one end of the gauges 22 are connected to a common solder tab 23 affixed with the insulation to the strip 16. The leads from the other two ends of the strain gauges 22 are connected respectively to insulated solder tabs 24 and 25 also affixed to the strip 16. More rugged insulated hook-up wires 21 connected to the solder tabs 23, 24 and 25 are lead away from the semiconductor strain gauge assembly 20 to the remainder of a conventional Wheatstone bridge (not shown) or other conventional resistance measuring circuitry. Preferably, a Wheatstone bridge circuit is used in which the semiconductors 22 in FIG. 6 form adjacent arms of the bride, the other two resistance members of the bridge being external to the pressure sensing unit 5. When using a pair of semiconductor strain gauges 22, the changes in resistance are sufficient to drive a Tyco DM 100 digital display unit, which allowing for proper zeroing, scale factor and calibration, can be arranged to readout flow rate.

The resistance of the semiconductor strain gauge 22 also varies with temperature. Thus, unless it is possible to rezero the readout at the current temperature, the temperature component of resistance should be continuously accounted for. One way of accomplishing active temperature compensation, as shown in FIG. 6 is to affix another pair of semiconductor strain gauges 22a, identical to gauges 22, to the surface of the strip 16 orthogonal to the strain axis so that they are substantially unaffected by curvilinear deflection. Thus any resistance variation in the "dummy" gauges 22a will be attributed almost entirely to temperature change. The compensating semiconductors 22a are connected in series between hook-up wires 21a which are lead away from the assembly 20 along with wires 21 to external circuitry which measures the composite resistance change in the active devices 22, due mostly to strain and partly to temperature, and subtracts the temperature component sensed by the compensating passive devices 22a. The result is a reading attributable to strain alone.

An alternate type of strain gauge assembly 20', as shown in FIG. 6a includes a wire strain gauge 26 preferably of the type SR-4 manufactured by BLH Electronics of Waltham, Masschusetts, providing unidirectional leads which are connected via a pair of solder tabs and hook-up wires 21 respectively. The wire strain gauge 26, preferably made of a constantan alloy, although less sensitive than the semiconductor gauge, has one significant advantage: it has a very low resistance/temperature coefficient. Thus over ordinary ranges, temperature compensation can be dispensed with as the gauge 26 responds almost solely to strain. In this embodiment 20', if a temperature sensor is still desired, a thermistor 26a may be situated within the diaphragm assembly 13, for example, cemented to the strip 16, as shown in FIG. 6a. It does not, however, make up a part of the strain gauge assembly 20'.

In operation, with the reference to FIGS. 1, 3, and 4, because of the flow restrictive flowmeter 2, there is a pressure differential between taps 7 and 9 when fluid is flowing in the line 1. Pressure at tap 7 is communicated via tube 6 to the cavity formed between the diaphragm assembly 13 and the inner recess 10b of the orifice plate 10. The somewhat lower pressure at tap 9 is communicated by tube 8 to the interior cavity between the diaphragm assembly 13 and the inner recess 11b of the orifice plate 11. If these pressures are approximately the same, the diaphragm assembly 13 will remain nominally centered between the orifice plates 10 and 11, as shown in FIG. 3. If the pressures are unbalanced, the diaphragm assembly 13 will deflect toward the side with the lower pressure. The diaphragms 14 and 15 undergo conical deflection, which is converted to curvilinear deflection within the metallic strips 16 and 17. The curvilinear deflection strip 16 is experienced as an axial bending or strain by the strain gauge assembly 20, which alters the resistance of the gauge.

A particularly advantageous arrangement for the configuration of FIG. 1 is to size the diaphragm assembly 13 such that its maximum excursion (FIG. 4) corresponds to a flow rate of 20 gallons per minute, while the mechanical flowmeter 2 has a maximum capacity of 50 gallons per minute, for example. This may be desirable where the flowmeter scale does not progress at regular intervals for incremental increases in flow rate and is condensed in the lower part of the range. Thus it may be difficult to take precise enough visual readings from the flowmeter to satisfy process requirements. There may also be only infrequent need for readings in the upper half of the range, that is, up to 50 gallons per minute, for example. If that is the case, then the electrical readout pressure sensing unit 5 can be dedicated to the lower range, which the process normally involves, with the flowmeter 2 being present not just as a "backup" unit, but to provide the necessary although infrequent readings at a higher flow rate.

FIG. 4 shows the over-pressure condition, corresponding in the preceding example to a flow rate of more than 20 gallons per minute in fluid line 1 (FIG. 1), where the diaphragm assembly 13 is at its maximum rightward deflection. The inner face 11b of the orifice plate 11 is contoured with annular ribbing matching that of the deflected diaphragm 15 so that the diaphragm 15 nests in the inner surface 11b of the orifice plate 11. The opposing inner face 10b of the other orifice plate is similarly contoured to conform to the annular ribbing of the diaphragm 14. The purpose of nesting feature is to prevent harm to the diaphragm assembly 13 and particularly to the semiconductor strain gauge assembly 20, even though the pressure differential is beyond the maximum reading of the differential pressure sensing unit 5.

FIGS. 7 and 8 illustrate an alternative embodiment of the diaphragm assembly for use with a pair of opposed orifice plates as in the preferred embodiment shown in FIGS. 2-4. The alternate diaphragms 28 and 29 are circumferentially sealed by diaphragm sealing rings 30 and 31. In this arrangement, the metal strips 16 and 17 and the gasket 18 are dispensed with and the strain gauge assembly 32 is bonded directly to the central area of one or the other of the diaphragms 28 and 29. The leads are taken out between the rings 30 and 31.

The apparatus of FIG. 9 is still another embodiment, 27', of the diaphragm assembly in which one of the diaphragms 28' is reversed so that the two diaphragms are in a nesting configuration. Again, strain gauge 32 is bonded to the surface of one of the diaphragms and the electrical leads are taken out through a hole in the sealing ring 30.

FIG. 10 illustrates a differential pressure sensing unit 33, having a diaphragm assembly 13 inside as described in connection with FIGS. 2-4. The orifice plates 34 and 35 of the sensing unit 33 are modified to provide an inlet and outlet on each side. Thus, orifice plate 34 has a pair of spaced threaded bores 34a and 34b and orifice plate 35 has a pair of spaced threaded bores 35a and 35b. As in FIG. 1, tube 6 from tap 7 is connected via a fitting to port 34a and tube 8 from tap 9 is connected via a fitting to port 35a. In place of the mechanical flowmeter 2 of FIG. 1, an orifice plate assembly 36 is mounted in line 1 between the taps 7 and 9. The assembly 36 includes a pair of opposed orifice plates 37 and 38, which may be provided by integral pipe flanges. Between the plates 37 and 38 is another plate (not shown) which has a hole of smaller diameter than the main line 1, through which the fluid must pass. This passageway forms a fixed orifice between the taps 7 and 9. As discussed above, the differential pressure between these points varies with increasing flow rates so as to provide a way of measuring the fluid velocity indirectly.

Orifice clamping plate 37 is provided with an outer tap 39 in communication with the fluid pressure on the immediate upstream side of the orifice. Tap 39 is connected via tube 40 with appropriate fittings to the threaded port 34b in the orifice plate 34 of the sensing unit 33. Since there is a pressure drop between taps 7 and 39 because of their displacement in relation of the orifice in the main line 1, fluid will flow from tap 7 through tube 6 into the interior of the pressure sensing unit 33, across the face of the diaphragm 13 out the port 34b through the tube 40 and tap 39 back into the line 1, thus continuously shunting a small portion of the fluid in the main line 1 across the surface of the diaphragm assembly 13. Similarly, an outer tap 41 on the other orifice clamping plate 38 is connected by another tube 42 to port 35b in orifice plate 35 of the sensing unit 33, thus creating another shunt path for flow across the other face of the diaphragm assembly 13. With the fluid constantly washing the face of the diaphragm assembly 13, the diaphragm assembly is held at the same temperature as the fluid in the main line 1. The passive semiconductor strain gauges 22a (FIG. 6) or a thermistor 26a (FIG. 6a) may be utilized to provide a temperature reading because of their resistive response to temperature variation alone. With the same arrangement however, the flow rate sensing capability is retained since even though the fluid is flowing across the diaphragm assembly, the differential pressure between taps 7 and 9 will still be experienced across the diaphragm assembly. Thus the resistance change of the strain gauge assembly 20 (FIG. 6) or 20' (FIG. 6a) will still indicate the flow rate.

FIG. 11 illustrates an alternate embodiment of the differential pressure sensing unit in which the diaphragm assembly 13 (one-half of which is schematically indicated) is biased by means of an adjustable spring. A single intake port as in the embodiment of FIGS. 1–5 is offset from the center of the orifice plate 43, which is provided with a central bore 43a, in which a cylinder 44 is received and welded in place. The end of the cylinder 44 projecting from the back of the orifice plate 43 is threaded on the inside and outside to receive an inner adjustment nut 45 and outer cap nut 46 equipped with an O-ring seal. A coil spring 47 is received inside the cylinder 44 with one end of the spring 47 bearing against the center of the face of the diaphragm assembly 13 and the other end of the spring 47 bearing against the adjustment nut 45. Tightening the adjustment nut 45 biases the diaphragm assembly 13 to the left as viewed in FIG. 11. This mechanism may be useful, for example, in order to expand the range of the pressure sensing unit without using a different diaphragm assembly 13. It can also be used to zero the sensing unit at a particular differential pressure.

FIGS. 12 and 13 illustrate another embodiment of the invention in which a beam is deflected by the action of a pair of coupled bellows. In this case, a first bellows assembly 57 includes a cylindrical housing 58, having a threaded intake port 58a, and a coaxial cylindrical bellows chamber 58b. An inverted "accordian type" bellows 59 is coaxially suspended from the rim of the bellows chamber 58b, and sealed thereto by a threaded sealing ring 60. The bellows 59 has a cylindrical pleated sidewall and a circular end toward the bottom of the cavity. A hollow cylindrical cavity 58b remains in communication with the intake port 58a. Pressurized fluid entering the bellows assembly 57 via the intake port 58a tends to collapse the bellows 59 outwardly.

Axially opposed bellows assembly 61 is identical to bellows assembly 57, but reversed, and is mounted to an opposite mounting flange on a mounting frame. A translational link or coupling rod 62 interconnects the ends of the two bellows within the bellows assemblies 57 and 61. A flat deflection beam 63 made of a resilient flexible metal is mounted in a block 64 connected to the frame. The end of the beam is anchored in a tapered slot 64a in the block 64. The opening 64a supports the beam in its maximum curvature or deflection in eithr direction. The other end of the beam 63 is fitted with a cylindrical rod as a bearing or pivot member and received in a rounded U-shaped notch in the link 62 interconnecting the two bellows. Strain gauges 65 can be cemented to either or both sides of the beam 63 to sense the deflection of the beam. The assembly is shown equipped with a plastic cover 66 partially broken away in FIG. 13.

The device of FIGS. 12 and 13 is a differential pressure sensing unit, which can be substituted for the differential pressure sensing unit 5 shown, for example, in FIG. 1. The bellows assemblies 57 and 61 would be connected to the tubes 6 and 8 respectively.

The coacting bellows working in opposition remain stationary only if the pressures are exactly balanced. Any unbalance in the relative pressures in the bellows assembly 57 and 61 causes the link 62 to be displaced axially carrying with it the pivoting end of the beam 63. Deflection of the beam 63 causes strain on the gauge which results in a change in resistance which can be measured as discussed above in connection with the pressure sensing unit 5.

Some advantages of the device shown in FIGS. 12 and 13 are that the electrical leads and hook-up wires can be less critically arranged, the deflection beam 63 is easily removed and replaced without interfering with the bellows assemblies. Since the beam 63 is exposed, there are no constraints on the location of the semiconductor strain gauge and no possibility of mechanical interference. Moreover, mounting matched piezo-resistive semiconductor strain gauges at the same axial location on opposite sides of the beam 63 allows one to be placed in tension and the other one in compression when the beam deflects. The resulting change in resistance of the gauge is theoretically equal in amplitude and opposite in polarity, respectively. Since the combined resistance of the two gauges is independent of strain due to cancellation, a temperature compensation signal can be eazily extracted without adding "dummy" strain gauges.

The final illustrated embodiment of the invention is shown in FIG. 14 which depicts a modification of the embodiments of FIGS. 1 through 9 and which crosssectionally corresponds to FIG. 3. The wires 21 have been omitted for clarity. With suitable modification, this embodiment may also be used in connection with the differential pressure sensing unit 33 shown in FIG. 10.

The differential pressure sensing unit 70 shown in FIG. 14 includes a matched pair of circular orifice plates 71 and 72 clamped in the same manner as the plates 10 and 11 of FIGS. 2 and 3. The inner face of each orifice plate has a projecting circular rim 71a, 72a surrounding respective circular recesses or depressions 71b and 72b. Seated within each depression 71b and 72b is a separate, replaceable insert 73 and 74 which is held in place by suitable means, such as by pressure fitting, fasteners or strippable adhesive (none illustrated).

As in the embodiment of FIGS. 2 and 3, a strain gauge assembly 75 is sandwiched between the orifice plates 71 and 72. The strain gauge assembly is the same as any of the gauge assemblies depicted in connection with FIGS. 1 through 10, and therefore its description will not be repeated.

The inner faces 73a and 74a of the orifice plate inserts 73 and 74 are contoured with annular ribbing matching that of the diaphragm assembly 75 so that the assembly 75 nests within the inner faces 73a or 74a whenever maximum excursion of the assembly 75 is experienced. As described above in connection with FIG. 4, this nesting feature prevents harm to the diaphragm assembly 75. In addition, since the inserts 73 and 74 are replaceable, different inserts may be substituted to alter the maximum excursion of the diaphragm assembly 75 in order to protect the often very fragile strain gauge assembly, or the inserts may be changed to accomodate a different diaphragm assembly 75, all without replacement of the orifice plates 72 and 73.

A sealing ring 76, substantially identical to the sealing ring 19 (FIG. 3), is clamped between flared flanges of the diaphragm 75 which are seated in the outer flanges of the orifice plates 71 and 72. The outer flanges are finely ground to provide a fit seal between the diaphragm 75 and the orifice plates, avoiding the need for an additional seal, such as an O-ring.

The sealing ring 19 includes a pair of bores 77 into which adjustable set screws 78 are threaded. The set screws 78 extend inwardly from the bores 77 and abut curved flanges 79 of the flexible metal strips of the diaphragm assembly 75, the flanges 79 being extended slightly further than those of the strips 16 and 17 (FIG. 3). Adjustment of the set screws 78 against the flanges 79 slightly pretensions or biases the flexible metal strips, the amount of pretensioning being dependent upon the extent of the deformation of the flanges 79 by the set screws. A similar set screw (not illustrated) may also be included within the mouth 64a of the block 64 of the embodiment of FIGS. 12 and 13 to bias the strip 63.

The differential pressure sensing unit 70 functions in the same manner as those illustrated in FIGS. 1–10. With adjustment of the set screws 78, however, the diaphragm assembly may be biased in a fashion analogous to that shown in FIG. 11. If only one set screw is used, or if both are used but one is engaged against its respective flange 79 with greater force than the other, the diaphragm assembly 75 is biased in one direction. This mechanism can be used to expand the range of the pressure sensing unit without changing the diaphragm assembly 75, or can be used to initially "zero" the sensing unit or zero the sensing unit at a particular differential pressure. Also, if both set screws are engaged against their respective flanges 79 with equal force, the strain gauge assembly is firmly captured within the diaphragm assembly 75.

ACHIEVEMENTS

The devices disclosed above provide a low cost rugged electrical readout for differential fluid pressure utilizing a strain gauge in connection with a diaphragm or bellows. These differential pressure sensing units, while capable of indicating static pressure differences, are particularly useful for indicating flow rate in a fluid line with a flow restriction creating a pressure drop. The use of a diaphragm assembly allows the diaphragm area to be selected to attain the desired sensitivity without full flow limits. The strain gauge, whether coupled to a diaphragm or bellows, provides an electrical readout relative to differential pressure without any moving electrical contacts such as potentiometer sliders. The high resistance of the Wheatstone bridge components, of which the strain gauge forms a part, and inherent cancellation permit long external leads without any read out error, which means that no auxillary telemetering is necessary to provide a remote readout. In the diaphragm embodiments, there are no mechanical moving parts to wear out and by providing replaceable conforming inserts for the orifice plates, or by conforming the interior face of the orifice plates, over-pressure protection can be built in. The adjustment spring feature allows modification of the sensing range and calibration. Moreover, because semiconductor or wire strain gauges are used in other types of equipment, available readout instrumentation can be used for indicating, recording, controlling and data processing. Finally, in the embodiment of FIG. 10, flow across the surface or face of the diaphragm assembly allows temperature sensing within the diaphragm assembly, preferably using the semiconductor strain gauge assembly as both a temperature and pressure differential sensor. The result is a family of low-cost, rugged electrical readout devices for general service which can be added to liquid or gas lines without interfering with existing flowmeters or which can be used alone for differential readings or with a special flow restriction for flow rate readings.

I claim:

1. A differential pressure sensor, comprising a pair of plates each having a corresponding recess formed in an opposing face, means for clamping said plates together to form an interior cavity, each plate having an inlet port into said cavity adapted to be connected to a respective source of fluid pressure, a sealed diaphragm assembly positioned between said plates across said cavity having a pair of substantially parallel juxtaposed diaphragms peripherally clamped by said plates to sealingly divide said cavity into two chambers, and a strain assembly situated between said diaphragms and responsive to deflection thereof for producing an electrical variable indicative of the pressure differential between said chambers, said diaphragm assembly including a flexible metal strip arranged in parallel between said diaphragms spanning the width of said cavity, said strain gauge assembly being operatively affixed to said strip for sensing curvilinear deflection thereof.

2. Structure in accordance with claim 1, wherein said strain gauge assembly is a semiconductor strain gauge bonded to said strip.

3. Structure in accordance with claim 1, further comprising another metal strip parallel to the one strip between said diaphragms and coextensive therewith such that said strain gauge is located between said strips, and a flat disc-shaped gasket between said diaphragms and said strips, said gasket having an opening to accommodate said strain gauge assembly.

4. Structure in accordance with claim 3, wherein said gasket has a predetermined thickness sufficient to provide a gap between said other strip and the exposed surface of said strain gauge.

5. Structure in accordance with claim 1, wherein at least one of said diaphragms has annular ribbing formed therein, the recess in the face of the respective plate being contoured to match said ribbing so that said diaphragm nests in said recess at a predetermined maximum deflection.

6. Structure in accordance with claim 1 including a replaceable insert within said recess.

7. Structure in accordance with claim 6, wherein at least one of said diaphragms has annular ribbing formed therein, said insert in the respective plate being contoured to match said ribbing so that said diaphragm nests in said insert at a predetermined maximum deflection.

8. Structure in accordance with claim 1, further comprising a sealing ring between the peripheries of said diaphragms arranged such that the peripheral edge of each diaphragm is clamped between said ring and the respective plate.

9. Structure in accordance with claim 1, further including means for biasing said diaphragm assembly.

10. Structure in accordance with claim 9, wherein said biasing means includes a coil compression spring operatively arranged in one said plate and extending into contact of the center with the face of said diaphragm assembly for urging said diaphragm assembly away from said one plate, and means for adjusting the force exerted on said diaphragm assembly by said coil compressing spring.

11. Structure in accordance with claim 9, wherein said biasing means includes a set screw engaged against said strip to urge said strip toward one of said plates, and means for adjusting the force exerted on said strip by said set screw.

12. Structure in accordance with claim 1, wherein each plate has another port into said cavity for connection to a respective source of pressure, said ports in each plate being spaced from each other such that fluid can flow into the cavity from one port across the face of the diaphragm assembly and out from the other port.

13. In combination with a fluid line and a flow restrictive device mounted in said fluid line which creates a pressure drop in the fluid line across the flow restrictive device, the improvement comprising first and second taps in the fluid line on either side of the flow restrictive device and a differential fluid pressure sensor including first and second expansible fluid-tight chambers connected respectively to said first and second taps for expanding and contracting in response to the fluid pressure in said taps, respectively, a flexible metal strip mounted for curvilinear deflection in accordance with the relative expansion of said chamber, a strain gauge operatively affixed to said strip for sensing curvilinear deflection thereof, and third and fourth taps located in communication with said fluid line on either side of said flow restrictive device and closer thereto than the first and second taps respectively, each of said plates having an extra port into said cavity connected respectively to either the third or fourth tap in the fluid line such that the pressure differential between the taps on the same side of the flow restrictive device causes fluid flow between the two ports in the corresponding plate such that fluid flows across the surface of the diaphragm assembly, whereby the temperature of the diaphragm assembly, follows the temperature of the fluid in the fluid line.

14. Structure according to claim 13, wherein said strain gauge is a semiconductor strain gauge bonded to said strip.

15. Structure in accordance with claim 13, wherein said expansible chambers are coacting bellows assemblies arranged to work in opposition.

16. Structure in accordance with claim 15, further comprising a frame, said bellows assemblies being coaxially opposed on said frame with a translational connecting link therebetween, said strip having one end carried by said link and the other end fixed to said frame such that translation of said link bends said strip.

17. Structure in accordance with claim 16, further comprising another strain gauge operatively affixed to the opposition side of said strip such that when one gauge is in tension the other is in compression.

18. Structure in accordance with claim 17, wherein said strain gauges are semiconductor strain gauges bonded in parallel to opposite sides of said strip.

19. Structure in accordance with claim 18, wherein each said bellows assembly includes a body mounted on said frame having an open coaxial cavity and a port thereto for connection to the respective source of fluid pressure, an inverted coaxial bellows sealingly suspended within said cavity such that increasing pressure tends to collapse said bellows outwardly, said bellows having a pleated continuous sidewall and an end located toward the bottom of said cavity, the interior of said bellows being open, said link being connected through the interior of said bellows to said end.

20. Structure in accordance with claim 19, further comprising a block affixed to said frame having a tapered slot receiving and securing the end of said strip.

21. Structure in accordance with claim 20, wherein said other end of said strip has a rounded edge received in a rounded groove formed in said link to serve as a bearing in which said other end of said strip may pivot as necessary.

22. In combination with a fluid line and a flow restrictive device mounted in said fluid line which creates a pressure drop in the fluid line across the flow restrictive device, the improvement comprising first and second taps in the fluid line on either side of the flowmeter and a differential fluid pressure sensor including a pair of plates each having a corresponding recess formed in an opposing face, means for clamping said plates together to form an interior cavity, each plate having an inlet port into said cavity connected to the respective tap in the line, a diaphragm assembly positioned between said plates across said cavity having a pair of substantially parallel juxtaposed diaphragms peripherally clamped by said plates and sealingly dividing said cavity into two chamgers, a strain gauge assembly situated between said diaphragms responsive to deflection of the diaphragm assembly for producing an electrical variable indicitive of flow rate in the line, and a metal strip arranged in parallel between said diaphragms spanning the width of said cavity, said strain gauge assembly being operatively affixed to said strip for sensing curvilinear deflection.

23. Structure in accordance with claim 22, wherein said strain gauge assembly has a semiconductor strain gauge bonded to said strip.

* * * * *

UNITED STATES PATENT AND TRADEMARK OFFICE
CERTIFICATE OF CORRECTION

PATENT NO. : 4,221,134
DATED : September 9, 1980
INVENTOR(S) : Regner A. Ekstrom, Jr.

It is certified that error appears in the above-identified patent and that said Letters Patent are hereby corrected as shown below:

| | |
|---|---|
| Col. 2, l. 11 | "from" should be --form-- |
| Col. 4, l. 34 | "bride" should be --bridge-- |
| Col. 4, l. 64 | "Masschusetts" should be --Massachusetts-- |
| Col. 7, l. 44 | "eithr" should be --either-- |
| Col. 8, l. 10 | "gauge" should be --gauges-- |
| Col. 9, l. 59 | after "differential" insert --pressure-- |
| Col. 10, l. 3 | after "strain" insert --gauge-- |

Signed and Sealed this

Ninth Day of December 1980

[SEAL]

Attest:

SIDNEY A. DIAMOND

Attesting Officer    Commissioner of Patents and Trademarks